United States Patent [19]

Lundstrom

[11] 4,131,883
[45] Dec. 26, 1978

[54] CHARACTER GENERATOR

[75] Inventor: Jan-Erik Lundström, Vasteras, Sweden

[73] Assignee: ASEA Aktiebolag, Vasteras, Sweden

[21] Appl. No.: 759,208

[22] Filed: Jan. 13, 1977

[30] Foreign Application Priority Data

Jan. 20, 1976 [SE] Sweden .............................. 7600544

[51] Int. Cl.$^2$ ............................................. G06K 15/20
[52] U.S. Cl. .............................. 340/324 AD; 364/521; 364/900
[58] Field of Search ................... 340/324 A, 324 AD; 364/521

[56] References Cited

U.S. PATENT DOCUMENTS

| | | | |
|---|---|---|---|
| 3,713,135 | 1/1973 | Lazecki | 340/324 AD |
| 3,725,723 | * 4/1973 | Colston et al. | 340/324 AD |
| 3,772,676 | 11/1973 | Conley | 340/324 A |
| 3,952,297 | 4/1976 | Stauffer et al. | 340/324 A |

*Primary Examiner*—David L. Trafton
*Attorney, Agent, or Firm*—Pollock, Vande Sande & Priddy

[57] ABSTRACT

A character generator for a raster scanned display includes a virtual memory, a character memory, and character memory addressing circuitry. Character identifying codes are received by the virtual memory which produces the addresses in the character memory for the data for the first scanned line of each character. The character data for each scanned data line of a character contains sequential words containing N bits of video data to be displayed and two link bits. The link bits apprise the character memory addressing circuitry if subsequent words for that character appear on that scanned data line and if additional data lines for that character will have to be read on subsequent scans of the raster display frame.

5 Claims, 9 Drawing Figures

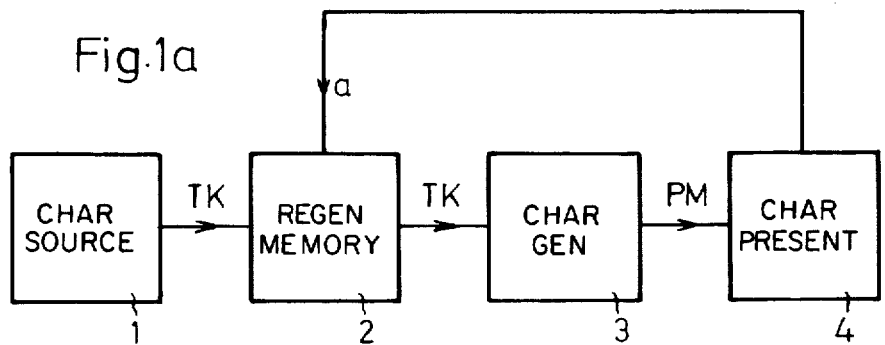
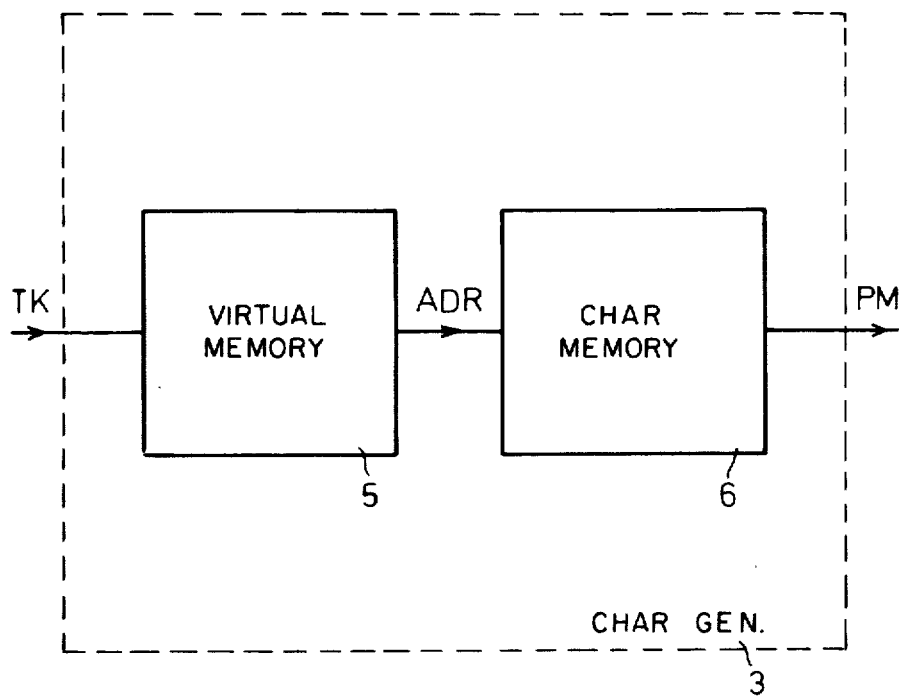

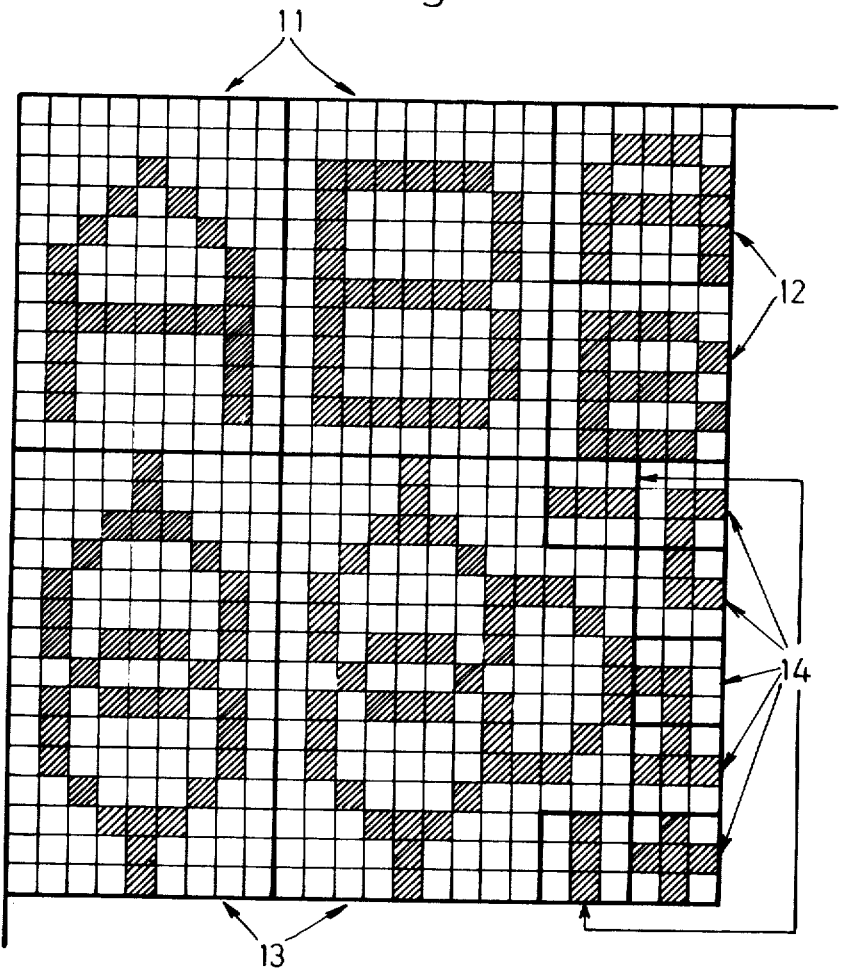

CHARACTER GENERATOR

The present invention relates to a character generator for generating characters in the form of dot matrices in dependence on supplied character information, said generator comprising a character memory in which for each character there is stored information which constitutes the dot matrix of the character.

Character generators of the above kind are known before, and such a generator is schematically shown in FIG. 1a in its context. An information source 1 delivers information about the characters to be presented by means of a presentation member 4. The information source may be a computer or a keyboard, and the presentation member 4, for example, a cathode ray tube or a typewriter. In the following the presentation member is assumed to be a cathode ray tube. The source 1 supplies for each character to be presented a character code TK in the form of a binary word to the regenerative memory 2, where the word is stored. A large number of such words (= characters) may be stored simultaneously in the memory. For each character to be written the memory 2 delivers a word constituting the character code TK of the character to the character generator 3. The character generator consists, in principle, of a memory in which a dot matrix is stored for each character, said dot matrix containing information as to which dots are to be lighted or extinguished in the form of, for example, a number of consecutive bits. FIG. 1b shows a simplified example of how the character shown in the figure is built up of a dot matrix with three raster lines I, II and III, each having three dots. If a lighted dot on the cathode ray tube is designated with a binary one and an extinguished dot with a zero and if the dots are assumed to be taken in numerical order, the word which constitutes or contains the dot matrix of the character will be as follows:

010 111 010

The character code supplied from the regenerative memory 2 acts as the address for the place in the memory in the character generator where the dot matrix of the character is stored. When a certain character code is delivered from the regenerative memory 2, the character generator 3 thus delivers a word PM, constituting the dot matrix of the character, to the presentation member 4 (the cathode ray tube), and this word then controls the intensity of the electron beam so that (see the above example and FIG. 1b) the character is displayed on the cathode ray tube.

After each character, a signal a is delivered from the character memory 3 or the presentation member 4 to the regenerative memory 2, which then delivers the code for the next character to the character memory. As long as no changed information is received from the source 1, all the characters that are presented on the cathode ray tube at the time are stored in the regenerative memory, and all these characters are written out periodically on the cathode ray tube, for example 50 times per second.

Systems of this kind involve the disadvantage that all the dot matrices must have equal heights and widths, that is constant line spacing and constant character spacing must be employed. Further, in each matrix all the dots of the matrix must be run through each time even if only a small number of them are used for the character. This results in great demands on the memory capacity, a low working speed, and, if several character sizes are desired, a complete set of memories for each character size must be arranged. If it is desirable to have more than two character sizes the character generator will therefore become prohibitively expensive, since the very memory capacity is an extremely costly part of this kind of equipment.

The invention aims to provide a character generator, in which it will be possible with a reasonable memory capacity to present characters in the form of dot matrices of arbitrary size, and the size of the characters/the matrices may vary arbitrarily from character to character both in height and in width. A device according to the invention further makes it possible, particularly for complicated characters, to use dot matrices of other shapes than rectangular, which may result in a considerable reduction of the required memory capacity and an increase in speed.

What characterises a character generator according to the invention will be clear from the appended claims.

The invention will be described in greater detail with reference to the accompanying FIGS. 1-7.

FIG. 1a shows a block diagram for a previously known character generator and FIG. 1b an example of a character generated by such a generator.

FIG. 2 shows the principle of a character generator according to the invention.

FIG. 3a shows in more detail an example of the operation and construction of such a character generator, and FIG. 3b an example of the appearance of the characters that are stored in the generator according to FIG. 3a.

FIG. 4 finally shows examples of further characters which may be generated with the help of a generator according to the invention.

Figure 5:
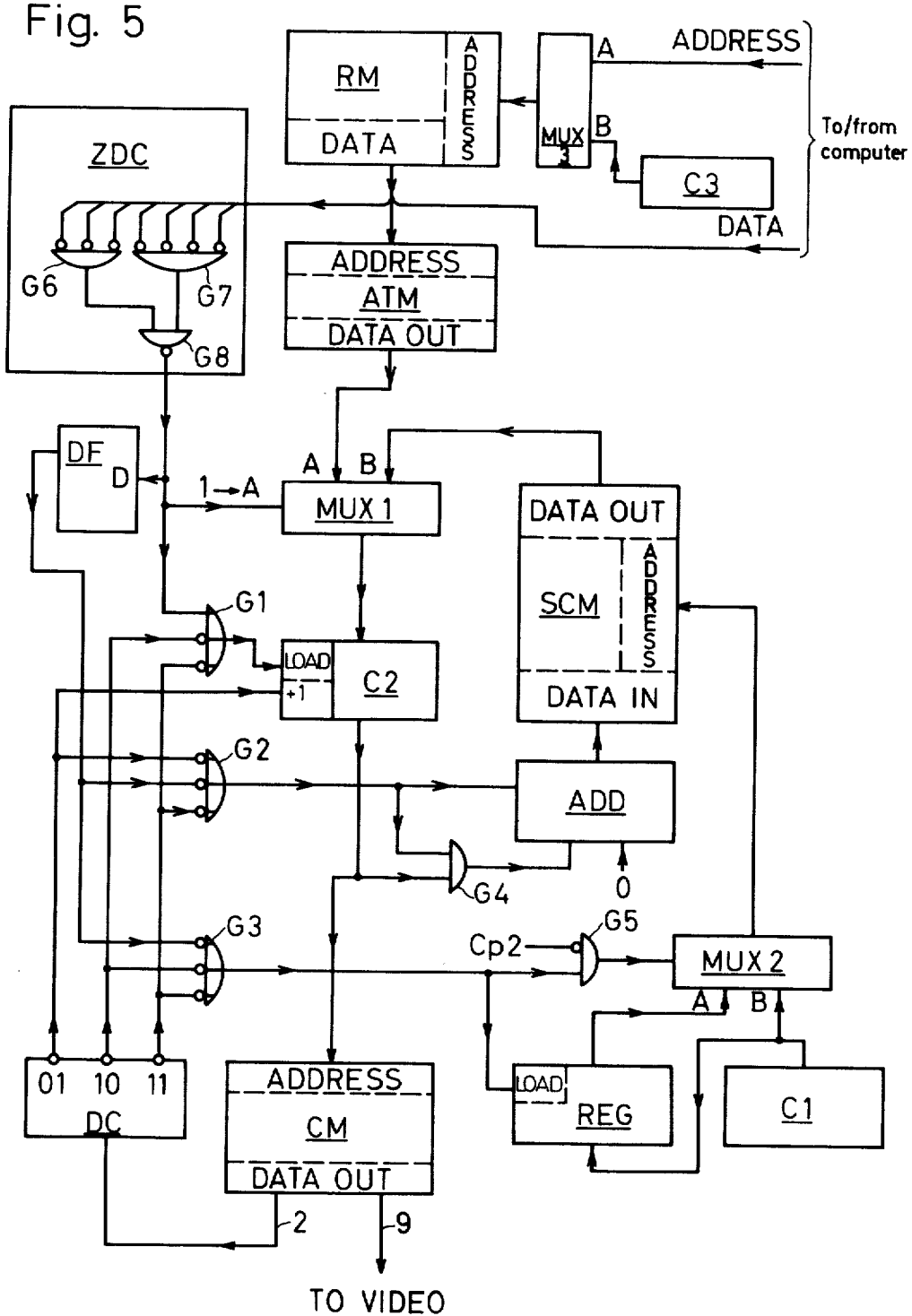
Figure 6:
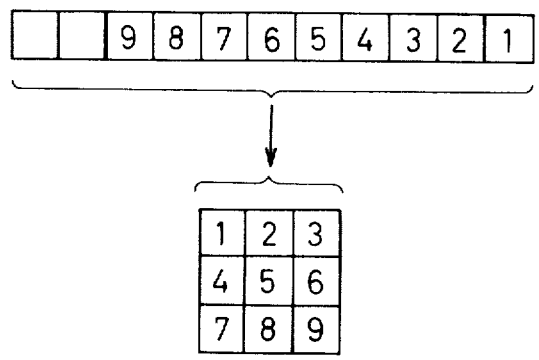

FIG. 5 shows in more detail a device according to the invention,

FIG. 6 shows a word in the character memory and the corresponding dot matrix.

Figure 7:
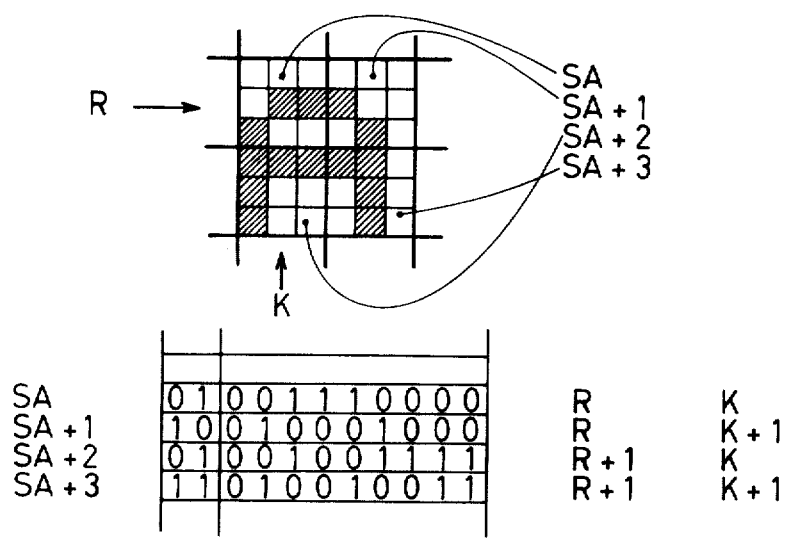

FIG. 7 shows an example of a character with its word in the character memory.

FIGS. 1a and 1b have been described above. FIG. 2 shows how a character generator 3 according to the invention is divided into a so-called virtual memory 5 and a character memory 6. The incoming character code TK is supplied to the virtual memory 5. This is a highly real memory and in it there is stored for each character code the address of the location in the character memory 6 where the dot matrix for the corresponding character is stored. Thus, if the character code (TK) for, for example, the letter "A" comes in from the regenerative memory 2, the memory 5 picks out and delivers to the character memory 6 the address (ADR) of the location in the memory 6 where the dot matrix for the letter A is stored, and this dot matrix is then delivered in the form of a digital word (PM) to the presentation member. Seen from the input side of the character generator, the virtual memory 5 has the same function as the known character generator (3 in FIG. 1), where the character code selects the dot matrix of a character directly in the character memory. Since, therefore, the memory 5 from this point of view can be regarded as a character memory despite the fact that it is not, it is referred to here as a "virtual memory".

Figure 3A:
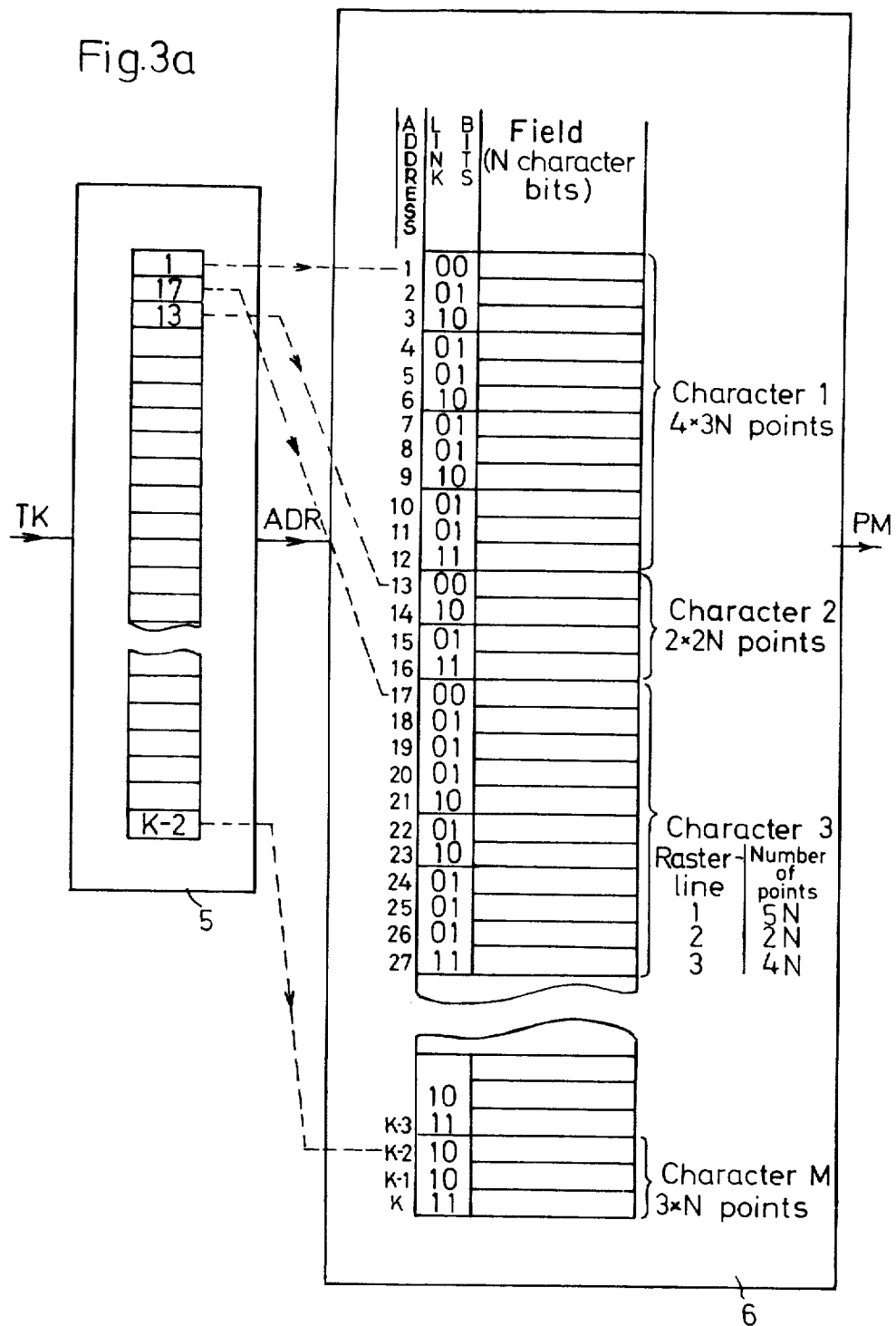

FIG. 3a shows in more detail an example of the construction and function of the character generator according to the invention. The virtual memory 5 contains K-2 cells, one for each character, and in each cell there is a word constituting the address of the cell in the character memory 6 in which the first field in the dot matrix of the character is stored. The character memory 6 contains a number of K cells with the addresses 1, 2, 3 . . . K-1, K, and each cell contains a field in the dot matrix of a character, as well as a number of link bits.

The concept "field" refers to a subordinate unit in the dot matrix of a character. In the case described here, a field is three consecutive dots in the matrix, that is, the so-called field size is three bits. FIG. 3b illustrates the concept. Character No. 1 there consists of fields 1–12, which are run through in sequence. In the example, field 1, for example, consists of bits 000, field 2 of bits 010, field 3 of bits 000, and so on. However, the field size may be selected arbitrarily and has therefore been designated N in FIG. 3a. Each field thus corresponds to and gives rise to N dots after each other in the direction of the raster lines on the cathode ray tube.

The link information in each cell in the character memory consists in the example of two bits with the following significance:

| binary code | significance |
|---|---|
| 00 | First field in the dot matrix. Next field is in the subsequent physical address. |
| 01 | The next field is in the subsequent physical address. |
| 10 | The last field on this raster line. The next field present in the subsequent physical address. If each raster line consists of only one dot, 10 may also indicate the first field in the dot matrix. |
| 11 | The last field in the dot matrix. |

In the character memory 6 it has been shown as an example how the three characters according to FIG. 3b can be stored. Character No. 1 has height 4 dots and width 3N = 3 · 3 = 9 dots. It consists of the first 12 fields in the memory. The link bits indicate how the electron beam is to be transferred and controls the movement from cell to cell in the memory 6. Link bits 01 indicate to what address the memory is to jump when the field in question has been written and that the following field shall be written to the right of the previous one on the same raster line. Similarly, bits 10 cause the memory to shift to the following address and gives rise to a line shift, that is, the next field is written at the far left-hand side on the raster line located immediately below. Link bits 11 deliver (when the field has been written), directly or via the presentation member, a signal to the regenerative memory to supply the character code for the next character to the virtual memory 5. The characters in the memory 6 need not, of course, be stored in the same sequence as their addresses in the memory 5.

Character No. 2 consists of 4 fields and 2 × 6 dots.

Character No. 3 consists of 11 fields. It shows, according to the invention, how a dot matrix does not need to be rectangular but can be composed of raster lines of different lenths, in this case 15, 6 and 12 dots, respectively.

The example in FIG. 3b shows the great flexibility and saving of memory capacity that is obtained through the invention. It shows how characters of different width and height can be arranged arbitrarily in succession in the memory, and how the size of the matrix and thus the memory capacity can be smoothly adjusted to what is required for each character, and further how additional memory capacity can be saved by deviating from the rectangular matrix shape.

Somewhat simplified, it can be said that previously known systems, because of the demand for constant matrix dimensions in the case according to FIG. 3b, demanded a matrix size of 4 × 5N dots, that is 20 × N dots per matrix and 60 fields for the three shown characters altogether. As will be clear from FIGS. 3a and 3b, only 27 fields altogether for the three characters are required in a device according to the invention.

FIG. 4 shows typical examples of characters and their dot matrices in a device according to the invention. The alpha-numerical characters designated 11 are A and B in a 12 × 9 matrix. The characters designated 12 are the same characters on a smaller scale and formed by a 6 × 6 matrix. The characters designated 13 are so-called semigraphic characters and constitute symbols for a two and three-winding transformer, respectively. The latter (righthand) character is an example of how, according to the invention, non-rectangular matrices can be used as well. The characters designated 14 show examples of how line lengths, corners and crossings can be formed in 3 × 3 matrices.

So sum up, it can thus be said that input data to the character generator, that is the character code, are treated as an address to the virtual memory (5), and the contents of the address thus indicated in the virtual memory (5) consists of a physical address to the character memory (6). This physical address indicates the first field of the character matrix in question. Each field also contains link information indicating how the field is arranged in the matrix, where in the character memory the next field is to be picked up, and when the character has been written and the next character can be started.

FIG. 5 shows in more detail a device according to the invention. A computer supplies information about the desired character (data) and about the location of the character on the cathode ray tube (address). The information is fed to a refresh memory RM, the address together with the signal from the counter C3 is fed through the multiplexor MUX3 controlled by the computer. For a visual display unit of 96 lines and 160 columns and a character repertoire of 128 characters, there is required a memory capacity of about $15.5 \times 10^3$ words at 7 bits, and the memory can be built up of, for example, 7 INTEL 2116 at 16384 × 1 bits). The address transformation memory ATM corresponds to the virtual memory 5 in FIG. 2 and contains the starting address for the character memory CM for all the character codes. It may be a ROM or PROM (e.g. 3MMI 6301). The output signal of the address memory is supplied to a multiplexor MUX1, which is controlled by the signal from the code detector ZDC. This consists of the three gates G6, G7, G8 and delivers an output signal "1" if there is a displayable code ($\neq 0$) on the output of the visual memory.

The multiplexors may be built up of standard TTL components (e.g. 74157).

The counter C2 indicates the address in the character memory for the character to be written. It may consist of 3 74LS 161. The character memory CM may consist of an arbitrary combination of ROM/PROM and RAM. Each word (field) contains, on the one hand, 9 bits which define the appearance of the character within each square within a 3×3 matrix, and on the other hand 2 link bits which have the following significance:

| Link bit | Significance |
|---|---|
| 01 | The next word in the character memory belongs to the character |
| 10 | End of character on this line |
| 11 | End of character |

The memory is thus organized in n words at 11 bits/word and may consist of n × MNI 6301. It has two outputs, one to the decoder DC for the link bits and one to the video output for the nine character bits.

The counter C1 indicates which columns to be shown and may consist of a number of 2 74 LS161. The register REG contains the start column to the next line for the character which is to be shown at that particular time. It may consist of 2 74 LS 173.

The decoder DC decodes the link bits and delivers in dependence on these bits output signals to the gates G1, G2, G3 and to the counter C2. It may consist of a 74155.

The D-flip flop DF delays the input signal from ZDC until the next clock pulse arrives and then emits an output signal to G2 and G3.

The start column memory SCM stores the address of the next word in the character memory which continues on the next line. The size of the memory may be 160 words at 12 bits each. For each column there is first performed a read cycle where the address from the preceding line is read out, then a write cycle where the address of the next line is written out. It may consist of 3 256×4 RAM Am 91110.

The adder ADD (e.g. 3 7483) adds 1 to the character memory address.

The counter C3 (e.g. 4 74 LS 161) keeps the address to the refresh memory (= the position on the screen) and counts up in time with the information being read from the refresh memory to the address transformation memory.

The other units, which are not dealt with in closer detail, may consist of standard TTL circuits.

The loadable counter C2, which addresses the character memory CM and thus determines which character or character part to be shown, may have its contents changed in three ways:

(a) The counter C3 addresses the visual memory

This method has the highest priority. If the contents of the addressed word ≠ 0, this means that a new character shall start to be shown (regardless of the value from the link bits, see (b) and (c) below). The code detector ZDC causes the code from the refresh memory RM in the address transformation memory ATM to be transformed into a start address, which is loaded into C2 via the multiplexor MUX1. The code then constitutes the address, and the start address the output data to the character memory.

(b) The link bits = 01

The value of C2 is increased by 1, that is, the following address in the character memory shall be displayed next.

(c) The link bits = 10 or 11

C2 is loaded from the start column memory via MUX1. The start column memory is then addressed by the counter C1.

The "raster scan method" used here is based on the fact that one line at a time is shown. One line consists of a number of scan lines (here = 3).

When showing one character which extends over several lines it is necessary to store away the information about how much of the character has been shown (= address in the character memory) and in which column on the line the character is to be continued on. For this purpose the start column memory SCM is used.

When a character ends on one line but continues on the next, the value of C2 plus one (= next word in the character memory) is stored away in the start column memory. The register REG is used as the address. REG is loaded with the contents of C1 when C2 is loaded according to (a) and (c) above. C1 indicates which column is shown at the present time. This means that the address of the start column memory when storing away the continued address of the character corresponds to the column where the character was first defined. (Adjustment of the character to the left).

All words (corresponding to columns) in the start column memory which are not to contain a continuation address for any sign are set at 0.

When showing the next line the words in the start column memory are loaded into C2, except in cases (a) and (b) above. Words containing 0 (which address words 0 in the character memory) generate the link bits 11 (characters ended) and a blank 3×3 matrix.

When a character in progress is interrupted by another character from the refresh memory according to a), 0 is written into the start column memory at the place (= the start column) where the continuation address would otherwise have been written.

At the top of FIG. 6 there is shown schematically a word in the character memory. The nine character bits at the righthand side are numbered 1-9 from right to left. They correspond to the fields in the 3×3 matrix which are shown in the square at the bottom of the figure. The two link bits lie at the left hand side of the character bits in the word.

At the top of FIG. 7 is shown an example of a character, a capital A, which can be generated with the help of the character generator according to the invention. The character consists of a number of 4 3×3 matrices, and each character is visible on two lines R and R+1 and two columns K and K+1. For each matrix one word is required, and FIG. 7 shows also the four words in the character memory which are required for the character. The words have the addresses SA, SA+1, SA+2 and SA+3. Each word consists of the two link bits at the lefthand side, and thereafter the nine character bits which are read from right to left. Line and column for the matrix, represented by each word, are indicated to the right of the word in the figure.

In the following a description is given step by step of the generation of an A according to FIG. 7.

1. The counter C3 addresses the word in the refresh memory on line R, column K which constitutes the code for A. The code is transformed in the address transformation memory into a start address (SA).

2. The code detector ZDC causes the start address SA to be loaded into the counter C2 by way of MUX1.

3. C2 addresses the character memory. Data from the character memory consist of:
   (a) dot matrix (9 bits). The bits are put in a buffer to be shown later on the cathode ray tube.
   (b) link bits (2 bits).

4. The link bits are in this case = 01, which means that the character continues in the next word in the character memory (i.e. the next position on the visual display unit). C1 (= address K+1) addresses the start column memory by way of MUX2 and data = 0 are written into word K+1.

The register REG contains the address K.

5. If no character arrives from the refresh memory, the value of C2 is increased by one (because the link bits are 01) to SA + 1. The value of C1 is increased by one to K + 2.

6. C2 addresses the character memory. The link bits are now = 10, i.e. the character is terminated on this line.

7. The register addresses the start column memory and the contents of C2 plus one are written in, i.e. SA + 2 is written into address K.

8. REG is loaded with the contents of C1.

9. If no character arrives from the visual memory, C2 is loaded with the contents of the start column memory addressed by C1 (address = K + 2). The value of C1 is increased by one to K + 3.

10. If no character is written on line R, column K + 2, the value of C2 = data in the start column memory with the address K + 2 = 0 (0 is always written into the start column memory when the character does not continue on the next line).

11. Address 0 in the character memory always contains link bits 11 and a dot matrix with all dots extinguished.

12. When column K is arrived at on line R + 1, the address SA + 2 stored away in paragraph 7 will be loaded into C2 (cf. paragraph 10). This occurs provided that no new character is supplied from the refresh memory.

13. See points 3 - 5.

14. C2 addresses the character memory. The link bits are now 11, i.e. the character is terminated.

15. The register REG addresses the start column memory and 0 is written in (since the character is terminated, cf. point 10).

The embodiments described above are only described in principle, but the realisation thereof by means of commercially available components in the form of integrated circuits (memory units, necessary logic, etc.) is an obvious measure taken by the expert. Also, the above embodiments are only examples, and a large number of other embodiments of the inventive concept are possible. The various addresses in the character memory may thus, if desired, contain further information, for example about the desired colour of the character or its part in the case of colour display units.

I claim:

1. A character generator for receiving input character data and generating corresponding characters of variable size and shape in the form of dot matrices on a raster scan display, comprising:

a character memory for storing information defining a characteristic dot matrix for each distinguishable character, said information including a plurality of dot matrix data fields, each field having a plurality of link bits associated therewith for defining the position of the field within the dot matrix of a character.

2. The character generator of claim 1 further comprising:

a virtual memory for receiving said input character data and generating for each distinguishable character a corresponding stored character memory address adapted to define a location in the character memory having the associated dot matrix information for said distinguishable character.

3. A character generator for receiving input character data and generating corresponding characters of variable size and shape in the form of dot matrices on a raster scan display, comprising:

a character memory for storing information defining a characteristic dot matrix for each distinguishable character, said information including a plurality of dot matrix data fields, each field having a plurality of link bits associated therewith for defining the position to the field within the dot matrix of a character; and a virtual memory for receiving said input character data and generating for each distinguishable character a corresponding stored character memory address adapted to define a location in the character memory having the associated dot matrix information for said distinguishable character.

4. A character generator for receiving input character data and generating corresponding characters of variable size and shape in the form of dot matrices on a raster scan display, comprising:

a character memory for storing information defining a characteristic dot matrix for each distinguishable character, said information including a plurality of dot matrix data fields, each field having a plurality of link bits associated therewith for defining the position of the field within the dot matrix of a character, said link bits being adapted to identify the last field of a character on a scan line and to identify the last field of the dot matrix of a character.

5. The character generator of claim 4 further comprising:

a virtual memory for receiving said input character data and generating for each distinguishable character a corresponding stored character memory address adapted to define a location in the character memory having the associated dot matrix information for said distinguishable character.

* * * * *